Dec. 16, 1930.     C. W. MILLER ET AL     1,785,137
COMPOSITE METAL ARTICLE AND METHOD OF MAKING THE SAME
Filed Dec. 30, 1927
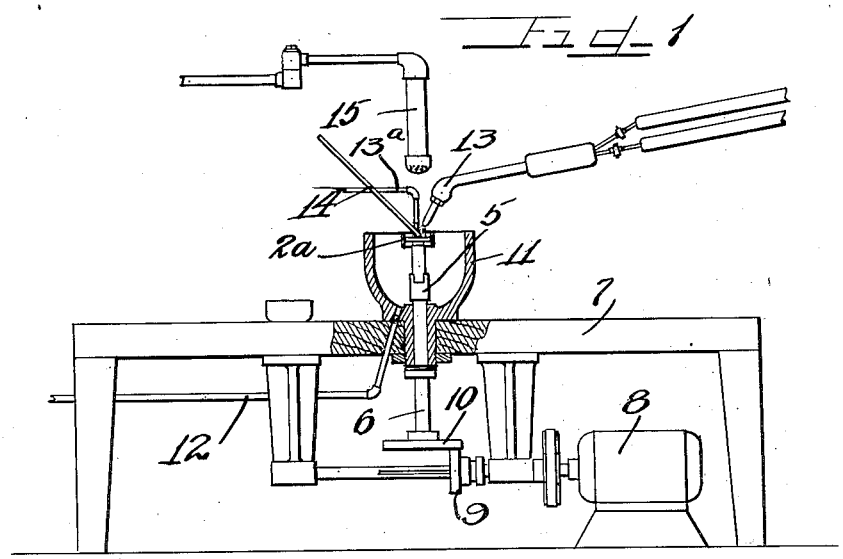
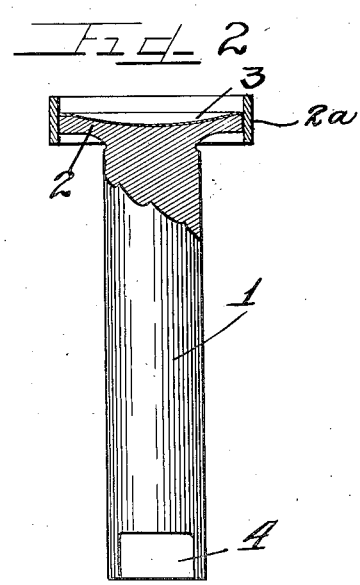
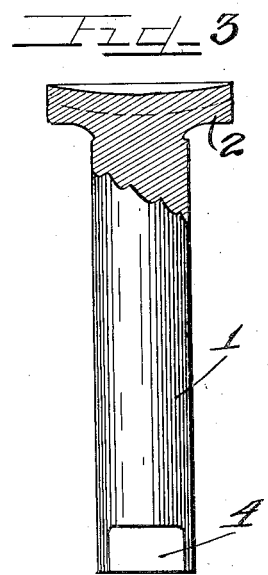

Patented Dec. 16, 1930

1,785,137

UNITED STATES PATENT OFFICE

CLARENCE W. MILLER AND RICHARD E. BISSELL, OF CLEVELAND, OHIO, ASSIGNORS TO THOMPSON PRODUCTS, INC., OF CLEVELAND, OHIO, A CORPORATION OF OHIO

COMPOSITE-METAL ARTICLE AND METHOD OF MAKING THE SAME

Application filed December 30, 1927. Serial No. 243,546.

This invention relates to a composite metal article and method of making the same and has particular reference to a poppet valve tappet which is so constructed as to be of long life and which combines the desirable qualities of a strong steel stem or body with a face of cast iron or some long wearing material which mates well with a hardened surface.

Attempts have been made heretofore to produce tappets having cast iron faces but such structures have been objectionable in that the faces thereof have often contained blow holes, have not been properly homogeneous in character, and have not been properly joined to the bodies.

It is an important object therefore of the present invention to provide a tappet or similar metal article having a face of a different desired metal applied thereto in such a manner as to obviate the aforesaid objections.

It is a further important object of this invention to provide an improved process of applying a cast iron or similar face to a metal article in such a manner as to insure homogeneity, obviate blow holes, and provide a permanent jointure.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation with parts in section showing an arrangement of apparatus designed to carry out the process and produce the article of this invention.

Figure 2 is a side elevation with parts in section showing a steel tappet body or stem prior to the application of the cast iron head thereto.

Figure 3 is a view similar to Figure 2 showing the tappet with the cast iron head applied thereto but prior to machining or grinding.

As shown on the drawings:

The reference numeral 1 indicates a stem or body portion of a valve tappet, the same being provided with a flanged head 2 which, for the purpose of practicing the process and producing the article of this invention, is provided with a concavity or recess in which a suitable flux 3 is placed. In order to prevent premature oxidation of the surface which contributes to the production of blow holes in the cast iron face, this flux 3 should be what is commonly known as a "wetting" flux and we have found sodium silicofluoride to be a suitable flux for this purpose.

In carrying out the process of this invention, the stem 1 is supported with the flattened portion 4 thereof engaged in a chuck 5 on the upper end of a vertical shaft 6 which is journalled in a suitable bearing in a table or bench 7. Mounted beneath the table or bench 7 is an electric motor or other source of power 8 and mounted on the drive shaft of said motor 8 is a friction wheel 9 which engages a friction plate 10 on the lower end of the vertical shaft 6 in order to frictionally engage with said vertical shaft and consequently rotate the body portion 1 of the tappet during the carrying out of the process of this invention. The upper end of the shaft 6 including the chuck 5 and the tappet body portion 1 are preferably surrounded by a receptacle 11 which has a drain pipe 12 communicating with its bottom for a purpose to be described hereinafter. A cylinder 2a of graphite or similar material may be forced over the flanged head 2 to prevent splashing over of the molten metal due to centrifugal action.

In practicing the process and producing the article of this invention, the body portion 1 is rotated inside the receptacle 11 by driving the shaft 6, and during rotation the flanged head 2 of said body portion or stem 1 is preheated by applying thereto a flame from a suitable torch or heating means 13. During preheating and prior to oxidation, a wetting flux such as previously described is applied to the concavity or recess in the upper side of the flanged head 2, and after the surface of this recess is thoroughly fluxed, a metal having the desired characteristics, such for example as cast iron, is melted into the recess from a rod 14 by the heat from the torch 13, rotation being continued during the deposition of the metal in the recess in order to render the head or face homogeneous in character by the centrifugal action and, at the same time, to obviate the danger of blow holes.

To further prevent oxidation as the metal is melted to the heads we may effect the melting in a reducing atmosphere such as provided by a gas jet 13a, hydrogen or other fuel vapor being added to the gas if desired to insure proper reducing characteristics.

After the metal from the rod 14 has been melted into the recess and built up on the head or end of the article to a desired extent, the whole article is subject, preferably while rotation is continued, to a drastic quench which may be conveniently achieved by turning on water from a swinging shower pipe 15, the excess quenching water being carried off from the receptacle through the drain pipe 12. The carrying out of this process results in an article such as is shown in Figure 3 which may be subsequently machined, ground or otherwise treated to provide a valve tappet having the desired characteristics. Due to proper fluxing of the recess prior to oxidation and due to the centrifugal action on the metal brought about by rotating the stem or body portion 1 while the metal is being melted onto the head thereof, a face which is homogeneous in character and free from blow holes is strongly and effectively jointed to the body portion.

While the process which we have described is particularly applicable for use in the application of cast iron heads to steel tappet stems or bodies, it is obvious that this process is also applicable to the production of a variety of metal articles wherein it is desirable to apply to the body of an article a portion of metal having different characteristics than the metal of the article.

We are aware that various details in the operation of this process may be varied without departing from the principles of this invention, and we therefore do not purpose limiting the patent granted on this invention otherwise than necessitated by the prior art.

We claim as our invention:

1. The method of applying an homogeneous cast iron head substantially free from pits and blow holes to a steel member comprising recessing the member and preheating the same while rotating, applying a flux to the recess during preheating and prior to oxidation, depositing molten cast iron on the fluxed preheated recess while continuing such rotation, and then quenching the article while rotation is continued.

2. The method of applying an homogeneous metal head substantially free from pits and blow holes to a metal article having different characteristics than the head comprising recessing the head member, rotating the member and preheating the same while rotating, applying a flux to the recess during preheating and prior to oxidation, depositing molten metal of a desired characteristic on the fluxed preheated recess while continuing such rotation, and then quenching the article while rotation is continued.

3. The method of applying an homogeneous cast iron head substantially free from pits and blow holes to a steel member comprising recessing the head of the member, preheating the same, applying a wetting flux to the recess during preheating and prior to oxidation, depositing molten cast iron on the fluxed preheated recess, and then quenching the article when the desired amount of molten cast iron has been deposited.

4. The process of applying an homogeneous metal head substantially free from pits and blow holes to a metal member having different characteristics than the head comprising applying a flux to the head of the metal member, applying a molten metal of a desired character to the fluxed head of said member, and rotating the member while so applying the molten metal thereto.

5. The process of applying an homogeneous metal head substantially free from pits and blow holes to a metal member having different characteristics than the head comprising applying molten metal of a desired character to said member, and rotating the member while so applying the molten metal thereto.

6. The process of applying an homogeneous metal head substantially free from pits and blow holes to a metal member having different characteristics than the head comprising rotating the member with that portion to which the metal is to be applied upward and depositing molten metal of a desired character on said portion while the member is being rotated, and then quenching while rotation is continued.

7. The method of applying an homogeneous cast iron head substantially free from pits and blow holes to a steel member comprising recessing the member, rotating the member and preheating the same while rotating, applying a wetting flux to the recess during preheating and prior to oxidation, depositing molten cast iron on the fluxed preheated recess while continuing such rotation, and then quenching the member while rotation is continued.

8. The method of applying an homogeneous cast iron head substantially free from pits and blow holes to a recessed steel member comprising preheating the recessed portion of said member, applying a wetting flux thereto to prevent oxidation of said recessed portion and depositing molten cast iron on the fluxed preheated portion, all of said steps being carried out while said member is being rotated.

9. The method of applying an homogeneous cast iron head free from pits and blow holes to a recessed steel member, comprising preheating the recessed portion of said member, applying a wetting flux thereto during the preheating step to prevent premature oxidation thereof, depositing molten cast iron on said fluxed preheated portion under reducing conditions and quenching said member, all of said steps being carried out while the member is being rotated.

In testimony whereof, we have hereunto subscribed our names at Cleveland, Cuyahoga County, Ohio.

CLARENCE W. MILLER.
RICHARD E. BISSELL.